United States Patent
Kwon et al.

(10) Patent No.: US 6,920,268 B2
(45) Date of Patent: Jul. 19, 2005

(54) VARIABLE ALIGNMENT-TYPE OPTICAL FIBER BLOCK

(75) Inventors: Oh-Dal Kwon, Suwon-shi (KR); Shin-Young Yoon, Suwon-shi (KR); Sang-Gil Shin, Yongin-shi (KR); Bang-Weon Lee, Seoul (KR); Jeong-Hwan Song, Seoul (KR); Sang-Wook Yoo, Suwon-shi (KR); Young-Gyu Son, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 10/439,028

(22) Filed: May 16, 2003

(65) Prior Publication Data
US 2003/0219212 A1 Nov. 27, 2003

(30) Foreign Application Priority Data
May 25, 2002 (KR) ........................................ 2002-29086

(51) Int. Cl.[7] ................................................ G02B 6/26
(52) U.S. Cl. ............................. 385/52; 385/55; 385/60; 385/65
(58) Field of Search .......................... 385/53–55, 60–68

(56) References Cited

U.S. PATENT DOCUMENTS 5,159,655 A * 10/1992 Ziebol et al. ................. 385/81
5,625,730 A * 4/1997 Ishikawa et al. .............. 385/49

* cited by examiner

Primary Examiner—Ellen E. Kim
(74) Attorney, Agent, or Firm—Cha & Reiter, L.L.C.

(57) ABSTRACT

Disclosed is a variable alignment-type optical fiber block in which alignment of waveguides can be changed according to temperature. The optical fiber block includes: a substrate having a receiving section formed at one end of the substrate, the receiving section having a predetermined volume; a ferrule seated in the receiving section, the ferrule having a hole in which an optical fiber is inserted; a first expandable block disposed between one side surface of the ferrule and an inner wall surface of the receiving section, which are opposed to each other, the first expandable block having a first thermal expansive coefficient; and, a second expandable block disposed between the other side surface of the ferrule and another inner wall surface of the receiving section, which are opposed to each other, the second expandable block having a second thermal expansive coefficient.

6 Claims, 7 Drawing Sheets

VARIABLE ALIGNMENT-TYPE OPTICAL FIBER BLOCK

CLAIM OF PRIORITY

This application claims priority to an application entitled "VARIABLE ALIGNMENT-TYPE OPTICAL FIBER BLOCK," filed in the Korean Intellectual Property Office on May 25, 2002 and assigned Serial No. 2002-29086, the contents of which are hereby incorporated by reference.

BACKGROUND OF THE INVENTION

1. Field of the Invention

The present invention relates to an optical device, and more particularly to an optical fiber block utilized as an optical connector.

2. Description of the Related Art

An optical fiber block is typically used as an input or output terminal of micro-optic devices and further used in aligning and connecting an optical fiber or optical fiber array with input or output terminals of a planar lightwave circuit (PLC).

Figure 1:
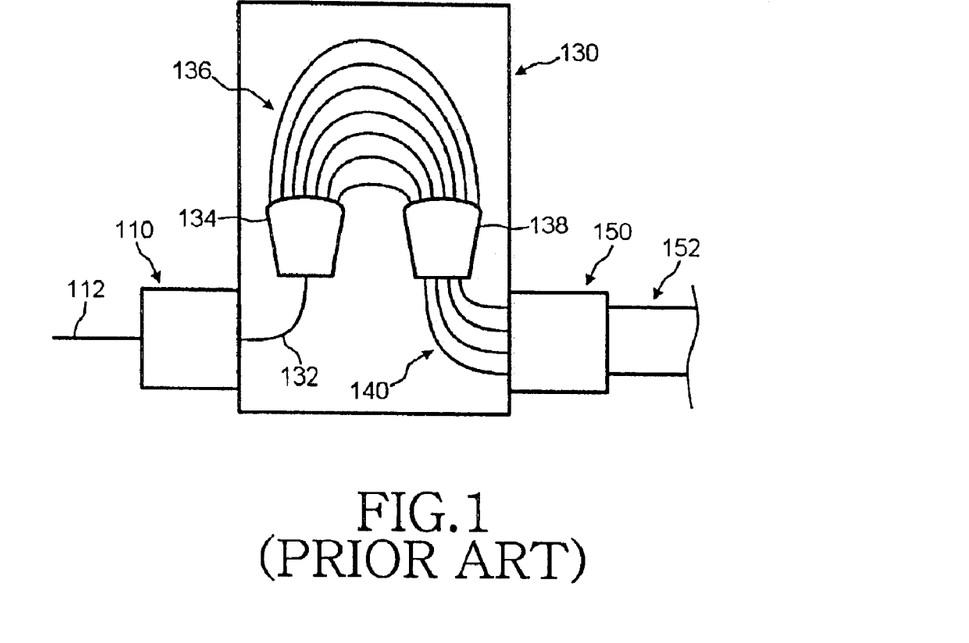
FIG. 1 is a schematic diagram showing the construction of a conventional arrayed waveguide grating module.
Figure 2:
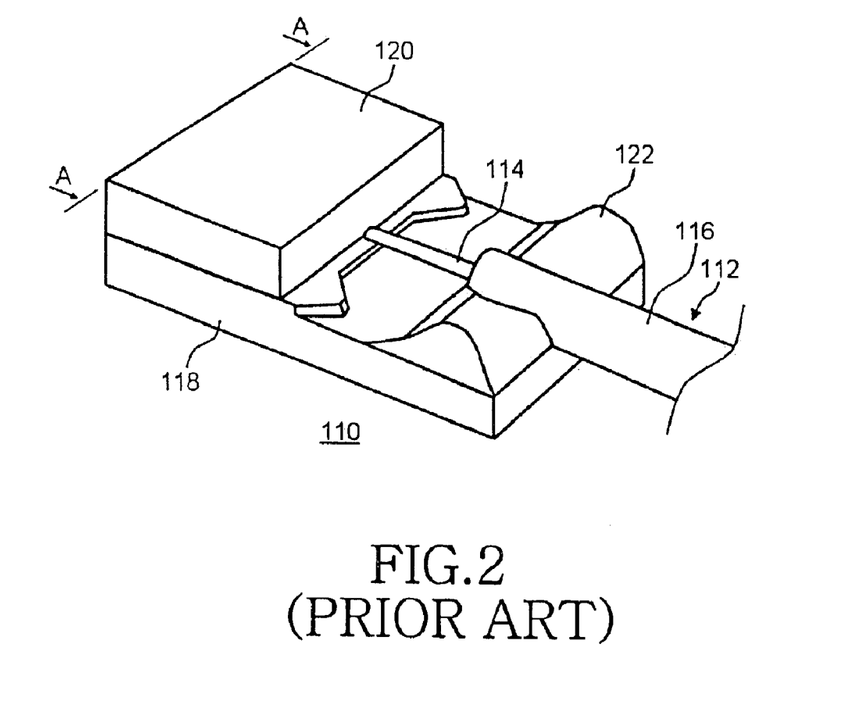
FIG. 2 is a perspective view of a single-core optical fiber block employed in the arrayed waveguide grating module shown in FIG. 1.
Figure 3:
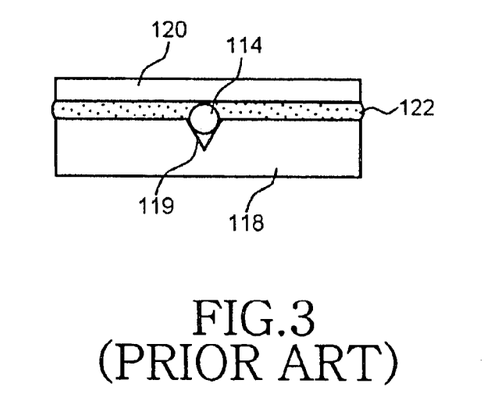
FIG. 3 is a sectional view of the single-core optical fiber block shown in FIG. 2, taken along line A—A.
Figure 4:
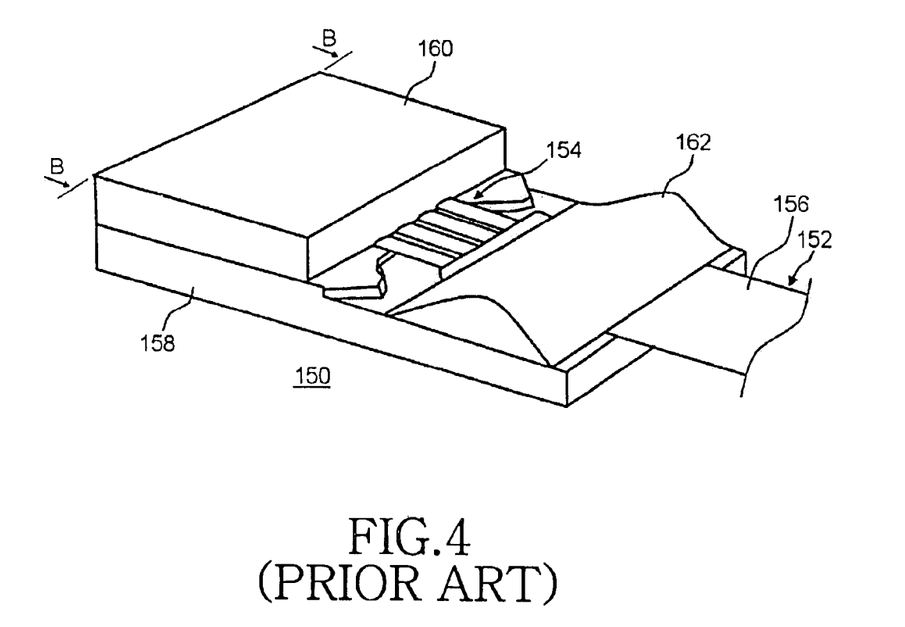
FIG. 4 is a perspective view of a multi-core optical fiber block employed in the arrayed waveguide grating module shown in FIG. 1.
Figure 5:
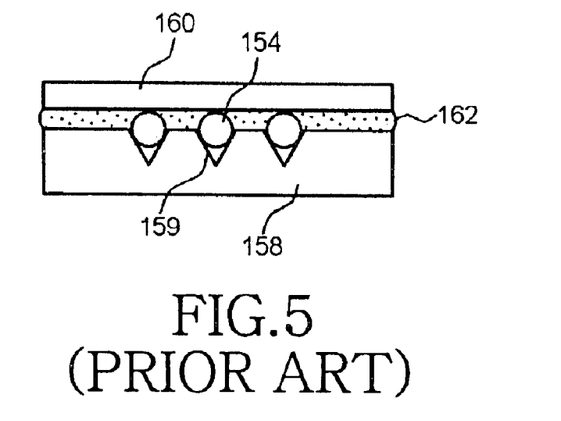
FIG. 5 is a sectional view of the multi-core optical fiber block shown in FIG. 4, taken along line B—B.

FIG. 1 is a schematic diagram showing the construction of a conventional arrayed waveguide grating module, and FIG. 2 is a perspective view of a single-core optical fiber block employed in the arrayed waveguide grating module shown in FIG. 1. FIG. 3 is a sectional view of the single-core optical fiber block shown in FIG. 2, taken along line A—A. FIG. 4 is a perspective view of a multi-core optical fiber block employed in the arrayed waveguide grating module shown in FIG. 1, and FIG. 5 is a sectional view of the multi-core optical fiber block shown in FIG. 4, taken along line B—B.

Referring to FIG. 1, the arrayed waveguide grating module according to the prior art includes a single-core optical fiber block 110, an arrayed waveguide grating 130, and a multi-core optical fiber block 150.

Referring to FIG. 2, the single-core optical fiber block 110 includes a first optical fiber 112, a first substrate 118, and a first flat glass plate 120. The first optical fiber 112 includes a bare optical fiber 114 and its coating layer 116. A portion of the bare optical fiber 114 with a predetermined length from one end of the first optical fiber 112 is not covered by the coating layer 116.

Referring to FIG. 3, the first substrate 118 has a V-shaped groove 119 formed on the upper surface of the first substrate 118, and the bare optical fiber 114 is seated in the V-shaped groove 119. After the bare optical fiber 114 is seated in the V-shaped groove 119, epoxy is applied on the first substrate 118 and the first optical fiber 112 to fix the first optical fiber 112. Then, the first flat glass plate 120 is placed on the epoxy applied on the first substrate 118 and the first optical fiber 112, thereby fixing the first optical fiber 112 and protecting the first optical fiber 112 from the external environment.

Referring back to FIG. 1, the arrayed waveguide grating 130 is a planar waveguide device, which includes an input optical waveguide 132, a first slab waveguide 134, an array of grating waveguides 136, a second slab waveguide 138, and an array of output optical waveguides 140. One end of the input optical waveguide 132 is connected with the first optical fiber 112, and the other end of the input optical waveguide 132 is connected with the first slab waveguide 134. The first slab waveguide 134 distributes an optical signal inputted through the input optical waveguide 132 to the arrayed grating waveguides 136. The arrayed grating waveguides 136 includes a plurality of optical waveguides having different lengths, wherein one end of each of the arrayed grating waveguides 136 is connected with the first slab waveguide 134 while the other end is connected with the second slab waveguide 138. The second slab waveguide 138 distributes the optical signal inputted through the arrayed grating waveguides 136 to the arrayed output optical waveguides 140 according to their wavelengths.

The arrayed output optical waveguides 140 include a plurality of optical waveguides, each of which has one end connected with the second slab waveguide 138 and the other end connected with the multi-core optical fiber block 150. The multi-core optical fiber block 150 includes an array of second optical fibers 152, a second substrate 158, and a second flat glass plate 160. The arrayed second optical fibers 152 include bare optical fibers 154 and coating 156. A portion of each bare optical fiber 154 with a predetermined length from one end of a corresponding second optical fiber 152 is exposed without the coating 156.

Referring to FIG. 4, the second substrate 158 has V-shaped grooves 159 formed on its upper surface, spaced at predetermined intervals apart from each other, and the bare optical fibers 154 are seated in the V-shaped grooves 159 one by one. After the bare optical fibers 154 are seated in the V-shaped grooves 159, epoxy is applied on the second substrate 158 and the second optical fibers 152 to fix the second optical fibers 152. Thereafter, the second flat glass plate 160 is placed on the epoxy applied on the second substrate 158 and the second optical fibers 152, thereby fixing the second optical fibers 152 and protecting the second optical fibers 152 from the external environment.

In the arrayed waveguide grating module described above, it is important for each of the output optical waveguides 140 of the arrayed waveguide grating 130 to keep a constant output wavelength and output power, and the wavelength of each output optical waveguide 140 must satisfy a wavelength standard recommended by the International Telecommunication Union (ITU) within an operation temperature range. That is, the gap between the output wavelengths must be a value within ±0.04 nm in the case where the output wavelengths have a frequency of 100 GHz. Further, it is preferable that the gap between the output wavelengths is ±0.01 nm smaller than the above limit, due to a wavelength error generated when the arrayed waveguide grating 130 is manufactured. In this case, the operation temperature range, which varies according to the module, is between −5° C. and 65° C. in the case of a heater-type module, which has the broadest operation temperature range.

As described above, when the operation temperature changes in the arrayed waveguide grating module, the wavelength of the optical signal outputted through each output optical waveguide 140 changes slightly. This change of wavelength deteriorates the performance of the arrayed waveguide grating module. In other words, as the arrayed waveguide grating 130 is made of silicon or silica, the refractive index of the arrayed waveguide grating 130 changes depending on the temperature, thereby generating the above-mentioned change in the wavelength.

The thermal change Θ defined by Expression 1 below must be compensated for.

$$\Theta = \frac{d\lambda}{dT} \qquad [\text{Expression 1}]$$

Further, a predetermined compensation factor αL (α represents the difference between thermal expansive coefficients of the arrayed waveguide grating and the optical fiber block, and L represents a predetermined distance) must be considered in manufacturing the arrayed waveguide grating module.

As described above, the conventional arrayed waveguide grating module requires a compensation for temperature change. Moreover, in the case of a heater-type arrayed waveguide grating module, the lifespan of the module is shortened, and the module must be provided with an additional electric circuit for maintaining a desired temperature.

SUMMARY OF THE INVENTION

Accordingly, the present invention has been made to solve the above-mentioned problems occurring in the prior art, by providing a variable, alignment-type optical fiber block, in which the alignment of waveguides can be changed according to the temperature change.

According to one aspect of the invention, there is provided a variable, alignment-type optical fiber block for connecting optical fibers. The optical fiber block comprising: a substrate having a receiving section formed at one end of the substrate, the receiving section having a predetermined volume; a ferrule seated in the receiving section, the ferrule having a hole in which an optical fiber is inserted; a first expandable block disposed between one side surface of the ferrule and an inner wall surface of the receiving section, which are opposed to each other, the first expandable block having a first thermal expansive coefficient; and, a second expandable block disposed between the other side surface of the ferrule and another inner wall surface of the receiving section, which are opposed to each other, the second expandable block having a second thermal expansive coefficient.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. For the purposes of clarity and simplicity, a detailed description of known functions and configurations incorporated herein will be omitted as it may make the subject matter of the present invention rather unclear.

Figure 6:
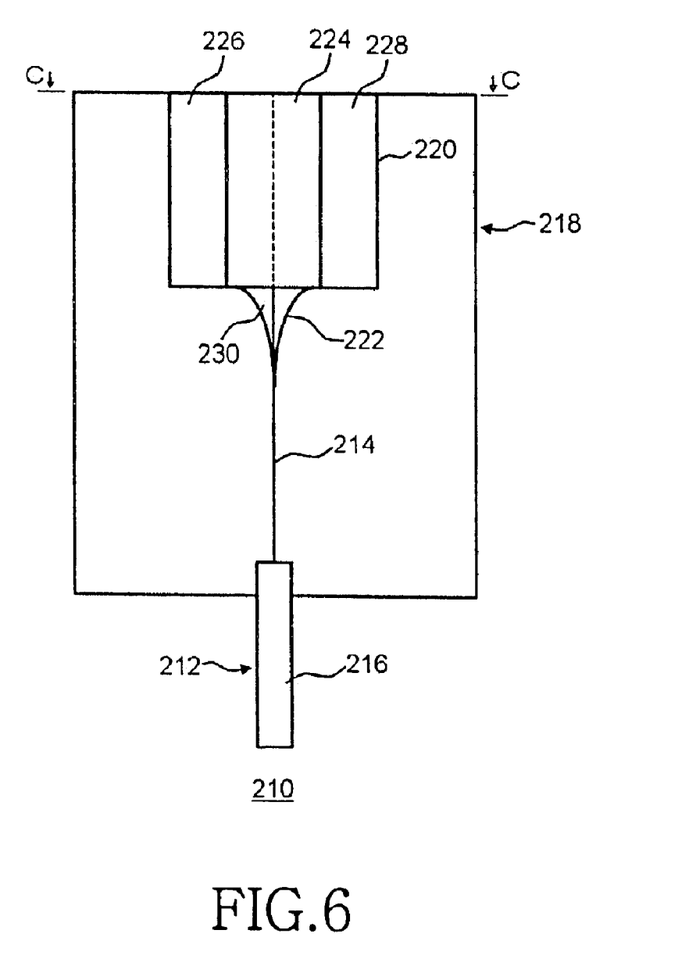
FIG. 6 is a planar view of a variable alignment-type single-core optical fiber block according to the first preferred embodiment of the present invention.
Figure 7:
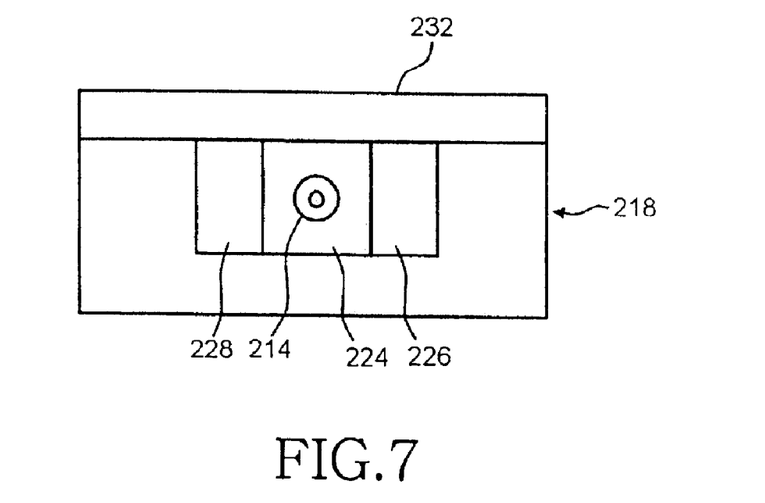
FIG. 7 is a front view of the single-core optical fiber block of FIG. 6, showing a flat glass plate in addition to the construction shown in FIG. 6.

FIG. 6 is a planar view illustrating a variable alignment-type single-core optical fiber block according to the first preferred embodiment of the present invention, and FIG. 7 is a front view of the single-core optical fiber block of FIG. 6, which shows a flat glass plate in addition to the construction shown in FIG. 6.

Referring to FIG. 6, the single-core optical fiber block 210 includes an optical fiber 212, a substrate 218, a rectangular ferrule 224, a first expandable block 226, a second expandable block 228, a sponge 230, and a flat glass plate 232. The optical fiber 212 includes a bare optical fiber 214 and coating 216, in which a portion of the bare optical fiber 214 with a predetermined length from one end of the optical fiber 212 is not covered by the coating 216.

The substrate 218 has a receiving section 220 with a predetermined volume. The receiving section 220 is shaped like a box, and the front and upper surfaces are open. Note that the receiving section 220 may be formed by photolithography.

The rectangular ferrule 224 is disposed in the receiving section 220 and has a hole through which the bare optical fiber 214 is inserted. After the bare optical fiber 214 is inserted in the hole of the rectangular ferrule 224, whose diameter is larger than that of the bare optical fiber 214, epoxy is injected in the hole of the rectangular ferrule 224 so that the bare optical fiber 214 can be fixed.

The first expandable block 226 is inserted between one side surface of the rectangular ferrule 224 and an inner wall surface of the receiving section 220, which are opposed to each other. The first expandable block 226 has a predetermined thermal expansive coefficient and may be made from polymer, metal, etc.

The second expandable block 228 is inserted between the other side surface of the rectangular ferrule 224 and the other inner wall surface of the receiving section 220, which are opposed to each other. The second expandable block 228 has a predetermined thermal expansive coefficient different from the thermal expansive coefficient of the first expandable block 226. The second expandable block 228 may be made from polymer, metal, etc.

In operation, when the operation temperature changes, the rectangular ferrule 224 can move toward the first expandable block 226 or the second expandable block 228 due to the difference between the thermal expansive coefficients of the first expandable block 226 and the second expandable block 228. Therefore, the thermal expansive coefficients of the first expandable block 226 and the second expandable block 228 can be selectively adjusted to meet a predetermined temperature-to-movement condition.

The sponge 230 is disposed adjacent to one end of the rectangular ferrule 224 through which the bare optical fiber 214 is inserted, so as to reduce the bending of the bare optical fiber 214 which may be generated in the process of inserting the bare optical fiber 214 into the end of the rectangular ferrule 224.

Referring to FIG. 7, the flat glass plate 232 is placed on the substrate 218, except for the receiving section 220, in the state where the epoxy has been applied on the optical fiber 212 and the upper surface of the substrate 218. The flat glass plate 232 fixes the optical fiber 212 and protects the optical fiber 212 from an external environment.

Figure 8:
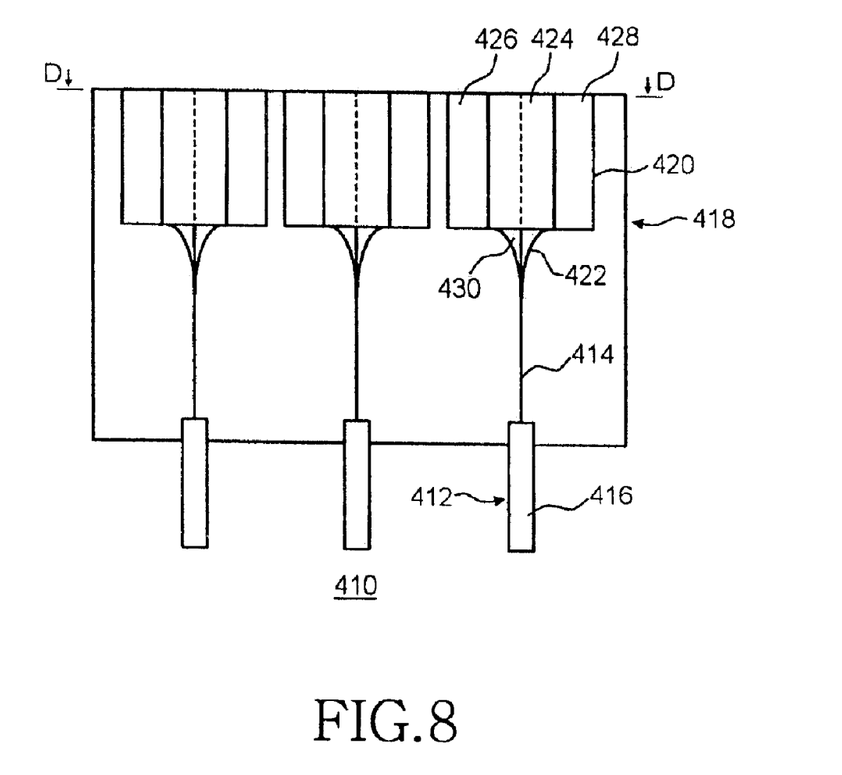
FIG. 8 is a planar view of a variable alignment-type multi-core optical fiber block according to the second preferred embodiment of the present invention.
Figure 9:
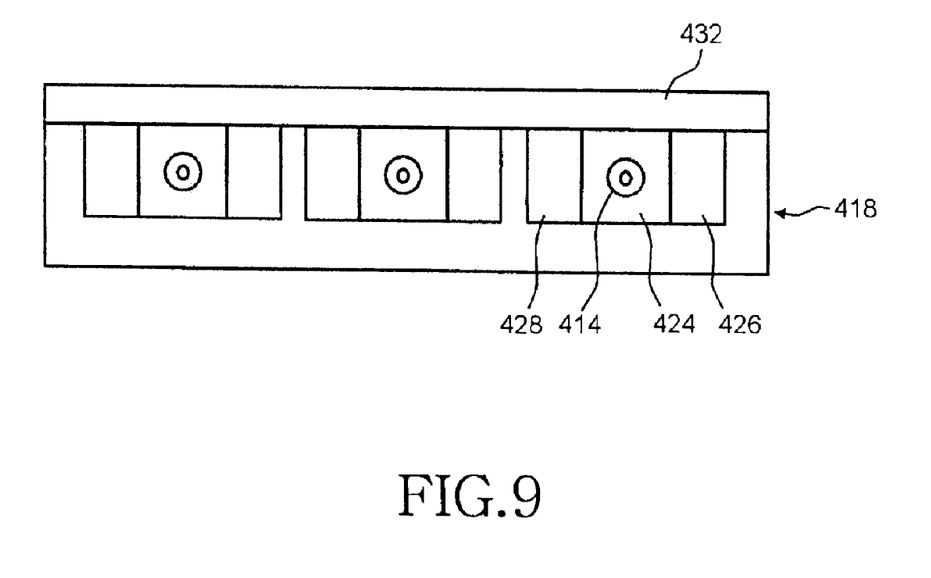
FIG. 9 is a front view of the multi-core optical fiber block of FIG. 8, showing a flat glass plate in addition to the construction shown in FIG. 8.

FIG. 8 is a plan view of a variable alignment-type multi-core optical fiber block according to the second preferred embodiment of the present invention, and FIG. 9 is a front view of the multi-core optical fiber block of FIG. 8, which shows a flat glass plate in addition to the construction shown in FIG. 8.

Referring to FIG. 8, the multi-core optical fiber block 410 includes an array of optical fibers 412, a substrate 418, a plurality of rectangular ferrules 424, a plurality of first expandable blocks 426, a plurality of second expandable blocks 428, a plurality of sponge members 430, and a flat glass plate 432.

Each of the arrayed optical fibers 412 includes a bare optical fiber 414 and coating 416, and a portion of the bare optical fiber 414 with a predetermined length from an end of the optical fiber 412 is not covered by the coating 416.

The substrate 418 has a plurality of receiving sections 420, each of which has a predetermined volume. Each of the receiving sections 420 is shaped like a box, and the front and upper surfaces are open. The receiving sections 420 may be formed by photolithography.

Each of the rectangular ferrules 424 is disposed in a corresponding receiving section 420 and has a hole through which a corresponding bare optical fiber 414 is inserted. After the bare optical fibers 414 are inserted in the holes of the rectangular ferrules 424, whose diameter is larger than that of the bare optical fiber 414, epoxy is injected in the holes of the rectangular ferrules 424 so that the bare optical fibers 414 can be fixed.

Each of the first expandable blocks 426 is inserted between one side surface of a corresponding rectangular ferrule 424 and an inner wall surface of a corresponding receiving section 420, which are opposed to each other. Each of the first expandable blocks 426 has a predetermined thermal expansive coefficient and may be made from polymer, metal, etc.

Each of the second expandable blocks 428 is inserted between the other side surface of the corresponding rectangular ferrule 424 and the other inner wall surface of the corresponding receiving section 420, which are opposed to each other. Each of the second expandable blocks 428 has a predetermined thermal expansive coefficient different from the thermal expansive coefficient of the first expandable block 426. The second expandable blocks 428 may be made from polymer, metal, etc.

Accordingly, when the operation temperature changes, each of the rectangular ferrules 424 can move toward the corresponding first expandable block 426 or second expandable block 428 due to the difference between the thermal expansive coefficients of the first expandable block 426 and the second expandable block 428. Therefore, the thermal expansive coefficients of the first expandable blocks 426 and the second expandable blocks 428 can be selectively adjusted to meet a predetermined temperature-to-movement condition.

Each of the sponge members 430 is disposed adjacent to one end of a corresponding rectangular ferrule 424 through which a corresponding bare optical fiber 414 is inserted to reduce the bending of the bare optical fiber 414, which may be generated in the process of inserting the bare optical fiber 414 into the end of the rectangular ferrule 424.

Referring to FIG. 9, the flat glass plate 432 is placed on the substrate 418, except for the receiving sections 420, in the state where the epoxy has been applied on the optical fibers 412 and the upper surface of the substrate 418. The flat glass plate 432 fixes the optical fibers 412 and protects the optical fibers 412 from external environment.

Figure 10:
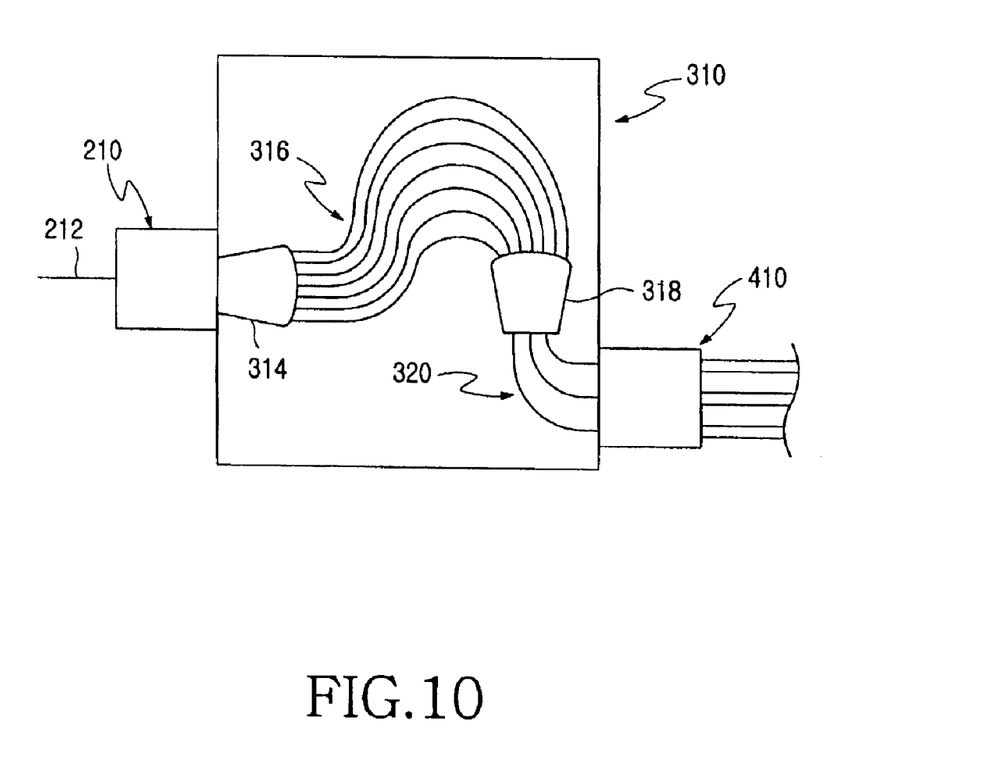
FIG. 10 is a schematic diagram showing the construction of a temperature-independent arrayed waveguide grating module, which employs the optical fiber blocks shown in FIGS. 6 and 8; and, FIG. 11 is a schematic view showing the construction of a temperature-independent arrayed waveguide grating module, which employs the optical fiber blocks shown in FIGS. 6 and 8.

FIG. 10 is a schematic view showing the construction of a temperature-independent arrayed waveguide grating module, which employs the optical fiber blocks shown in FIGS. 6 and 8. To avoid redundancy, a repetitive description about the similar construction will be omitted.

An arrayed waveguide grating 310 is a planar waveguide device, which includes a first slab waveguide 314, an array of grating waveguides 316, a second slab waveguide 318, and an array of output optical waveguides 320.

One end of the first slab waveguide 314 is connected to the single-core optical fiber block 210, and the other end of the first slab waveguide 314 is connected to the arrayed grating waveguides 316. The first slab waveguide 314 distributes an optical signal inputted through the optical fiber 212 to the arrayed grating waveguides 316.

The arrayed grating waveguides 316 include a plurality of optical waveguides having different lengths, and one end of each of the arrayed grating waveguides 316 is connected to the first slab waveguide 314, while the other end of each of the arrayed grating waveguides 316 is connected to the second slab waveguide 318.

The second slab waveguide 318 distributes the optical signals inputted through the arrayed grating waveguides 316 to the arrayed output optical waveguides 320 according to wavelengths of the optical signals.

The output optical waveguides 320 includes a plurality of optical waveguides, in which one end of each output optical waveguide 320 is connected to the second slab waveguide 318, while the other end of each output optical waveguide 320 is connected to the multi-core optical fiber block 410.

In operation, when the operation temperature of the arrayed waveguide grating module changes, the change in the refractive index of the module may increase the coupling loss between the first slab waveguide 314 and the optical fiber 212 packaged in the single-core optical fiber block 210. Also, in the single-core optical fiber block 210, either the first expandable block 226 or the second expandable block 228 expands or contracts according to the temperature change, thereby moving the rectangular ferrule 224. The rectangular ferrule 224 moves toward the first expandable block 226 or the second expandable block 228 due to the difference between thermal expansive coefficients of the first expandable block 226 and the second expandable block 228. As a result, rearrangement is carried out between the optical fiber 212 and the first slab waveguide 314, so as to reduce the coupling loss between the optical fiber 212 and the first slab waveguide 314.

Figure 11:
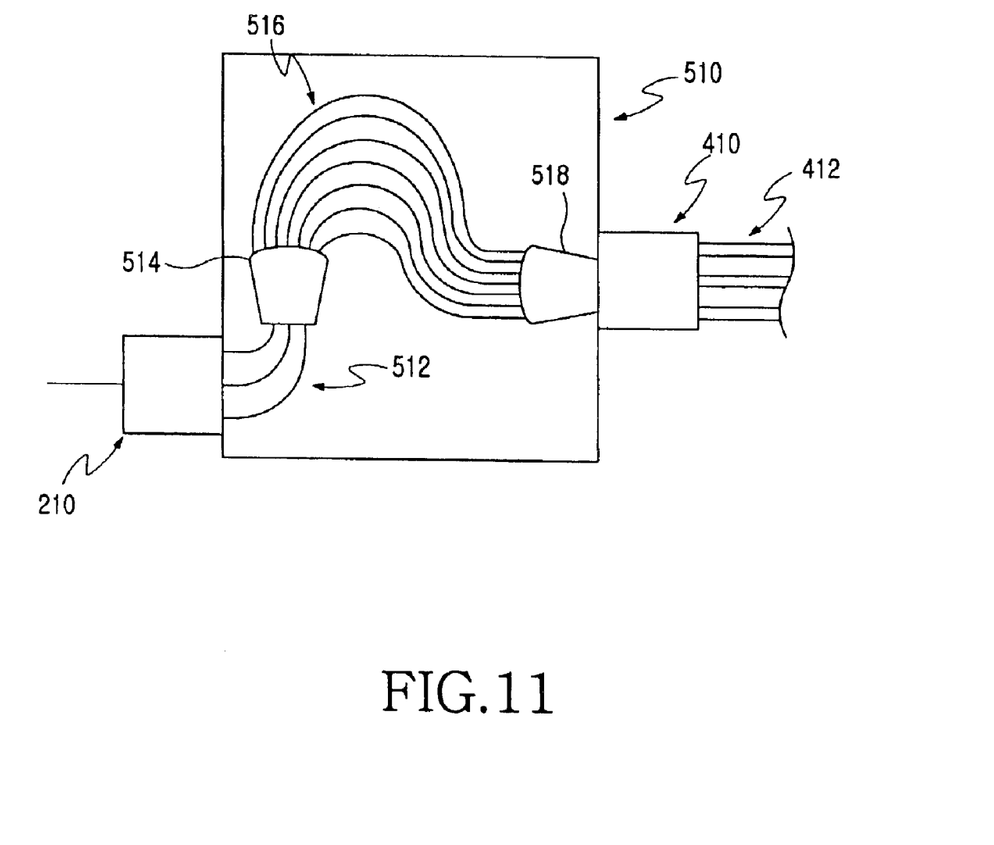

FIG. 11 is a schematic view showing the construction of a temperature-independent arrayed waveguide grating module, which employs the optical fiber blocks shown in FIGS. 6 and 8. To avoid redundancy, a repetitive description of any similar construction will be avoided.

An arrayed waveguide grating 510 is a planar waveguide device, which includes an array of input optical waveguides 512, a first slab waveguide 514, an array of grating waveguides 516, and a second slab waveguide 518.

The array of input optical waveguides 512 includes a plurality of optical waveguides, and one end of each input optical waveguide 512 is connected to the first slab waveguide 514, while the other end of each input optical waveguide 512 is connected to the single-core optical fiber block 210. As the arrayed input optical waveguides 512 consist of multiple optical waveguides, one of the optical waveguides can be selected according to a wavelength of an inputted optical signal.

One end of the first slab waveguide 514 is connected to the single-core optical fiber block 210, and the other end of the first slab waveguide 514 is connected to the arrayed grating waveguides 516. The first slab waveguide 514 distributes an optical signal inputted through one of the input optical waveguides 512 to the arrayed grating waveguides 516.

The arrayed grating waveguides 516 include a plurality of optical waveguides with different lengths. One end of each of the arrayed grating waveguides 516 is connected to the first slab waveguide 514, while the other end of each of the arrayed grating waveguides 516 is connected to the second slab waveguide 518.

The second slab waveguide 518 distributes the optical signals inputted through the arrayed grating waveguides 516 to the optical fibers 412 packaged in the multi-core optical fiber block 410 according to the wavelengths of the optical signals.

In operation, a change in the refractive index at the output end may increase the coupling loss between the second slab waveguide 518 and the optical fibers 412 packaged in the multi-core optical fiber block 410. Also, in the multi-core optical fiber block 410, each first expandable block 426 or second expandable block 428 expands or contracts according to the temperature change, thereby moving a corresponding rectangular ferrule 424. Each rectangular ferrule 424 moves toward a corresponding first expandable block 426 or second expandable block 428 due to the difference between thermal expansive coefficients of the first expandable block 426 and the second expandable block 428. As a result, rearrangement is carried out between a corresponding optical fiber 412 and the second slab waveguide 518 to reduce the coupling loss.

As described above, in the variable alignment-type optical fiber block according to the present invention, first and second expandable blocks enables a rectangular ferrule through which an optical fiber is inserted to move during operation, thereby enabling the optical fiber to be rearranged according to temperature change.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A variable alignment-type optical fiber block for connecting optical fibers comprising:
   a substrate having a receiving section formed at one end of the substrate;
   a ferrule disposed in the receiving section of the substrate, the ferrule having a hole through which an optical fiber is inserted;
   a first expandable block disposed between one side surface of the ferrule and an inner wall surface of the receiving section, which are opposed to each other, the first expandable block having a first thermal expansive coefficient; and,
   a second expandable block disposed between the other side surface of the ferrule and another inner wall surface of the receiving section, which are opposed to each other, the second expandable block having a second thermal expansive coefficient.

2. The optical fiber block as claimed in claim 1, wherein the shape of the receiving section is rectangular, and front and upper surfaces of the receiving section have an opening.

3. The optical fiber block as claimed in claim 1, further comprising a sponge disposed adjacent to one end of the ferrule through which the optical fiber is inserted.

4. The optical fiber block as claimed in claim 1, further comprising a flat glass plate covering the substrate for holding the optical fiber in place.

5. The optical fiber block as claimed in claim 1, wherein thermal expansive coefficients of the first expandable block and the second expandable block are selectively adjusted to meet a predetermined condition.

6. The optical fiber block as claimed in claim 5, wherein the ferrule moves toward the first expandable and the second expandable block due to the difference between the thermal expansive coefficients of the first expandable block and the second expandable block.

* * * * *